UNITED STATES PATENT OFFICE.

BENJAMIN H. LIGHTFOOT, OF PHILADELPHIA, PENNSYLVANIA.

IMPROVEMENT IN TREATING TANNED LEATHER.

Specification forming part of Letters Patent No. 40,669, dated November 17, 1863; reissue No. 4,920, dated May 28, 1872.

Specification describing an Improvement in Treating Tanned Leather, invented by BENJAMIN H. LIGHTFOOT, of Philadelphia, county of Philadelphia, State of Pennsylvania.

My invention consists in the treatment of tanned leather by applying to the same, substantially in the manner described, petroleum or any oily hydrocarbons holding paraffine in solution, in combination with tallow or its equivalent, so as to rapidly reduce the leather to the desired pliable condition at a much less cost than by the application of the usual oily and greasy substances hitherto used for the same purpose.

In order to enable others skilled in the art of currying to practice my invention, I will now proceed to describe the manner of carrying it into effect.

I have found by practical tests, and after a series of long-continued experiments, that tanned leather can be reduced to the desired pliability by the application of petroleum or rock-oil, or its equivalent, at much less expense than by the use of the ordinary greasy and oily compounds technically termed "dubbing."

Although I have used the crude petroleum as obtained direct from the oil-wells with marked success for the above purpose, some of the oily products extracted from petroleum may be employed with the best results—as, for instance, the heavy oil used for lubricating machinery, the grease also used for lubricating purposes, and consisting of paraffine with a little oil—in fact any greasy or oily hydrocarbons holding more or less paraffine in solution can be used, whether they be obtained by the distillation of coal, or found in a natural state, or extracted from petroleum.

In carrying my invention into effect, I adopt the following process: The tanned hide is first subjected to the preliminary soaking process adopted in currying leather, and is subsequently dressed and its inequalities removed by shaving and scouring processes so well understood by those familiar with the art of currying that a lengthy description is unnecessary. The hide is then allowed to become partially, or, as it is technically termed, "half-dried," after which it is ready for the application of the mixture of petroleum and tallow or their equivalents.

The proper proportions of the ingredients must be determined by the experience of the currier, as more tallow is required in warm than in cold weather.

The application is made in the following manner: The hide in its half-dried state is placed on a table or slab, and rubbed down by a suitable instrument until perfectly level. It is then coated over on the flesh side with the compound, care being taken that the entire surface is evenly covered. The hide or skin is then hung up and allowed to remain untouched for forty-eight hours or thereabout, according to the thickness of the skin. On removal it will be found that the leather has been effectually penetrated by the petroleum, and that its fibrous tissues have become thoroughly impregnated with the oily hydrocarbon and the paraffine held in solution by the latter, and that the leather has been reduced to the desired state of pliability, the tallow assisting to reduce it to that state.

After the superfluous portion of the compound has been removed from the leather, and the latter has been subjected to processes generally adopted after the application of the usual dubbing, the leather may be blackened, if desired, and it is then ready for the market.

The composition may be applied to both sides of the hide, but its application to one side only will, in most cases, be sufficient.

The trifling cost of petroleum compared with that of the usual tanners' oil, and the penetrating quality of the oily hydrocarbon, render the above-described process one of ready accomplishment at a much reduced cost, while at the same time the leather treated is of a quality equal if not superior to that treated by the usual dubbing.

It is evident that the composition may also be used with advantage for softening and keeping pliable harness or other articles of tanned and curried leather.

I claim as my invention—

1. The treatment of tanned leather by the application to the same, substantially in the manner described, of petroleum, or of any greasy or oily hydrocarbons holding paraffine in solution, in combination with tallow or its equivalent.

2. As a new article of manufacture, tanned leather, treated substantially as and for the purpose described.

In testimony whereof I have signed my name to this specification in the presence of two subscribing witnesses.

BENJAMIN H. LIGHTFOOT.

Witnesses:

WM. A. STEEL,

HARRY SMITH,